J. H. ZYBURN.
FLOUR SIFTER.
APPLICATION FILED DEC. 26, 1911.
1,024,962.
Patented Apr. 30, 1912.
2 SHEETS—SHEET 1.
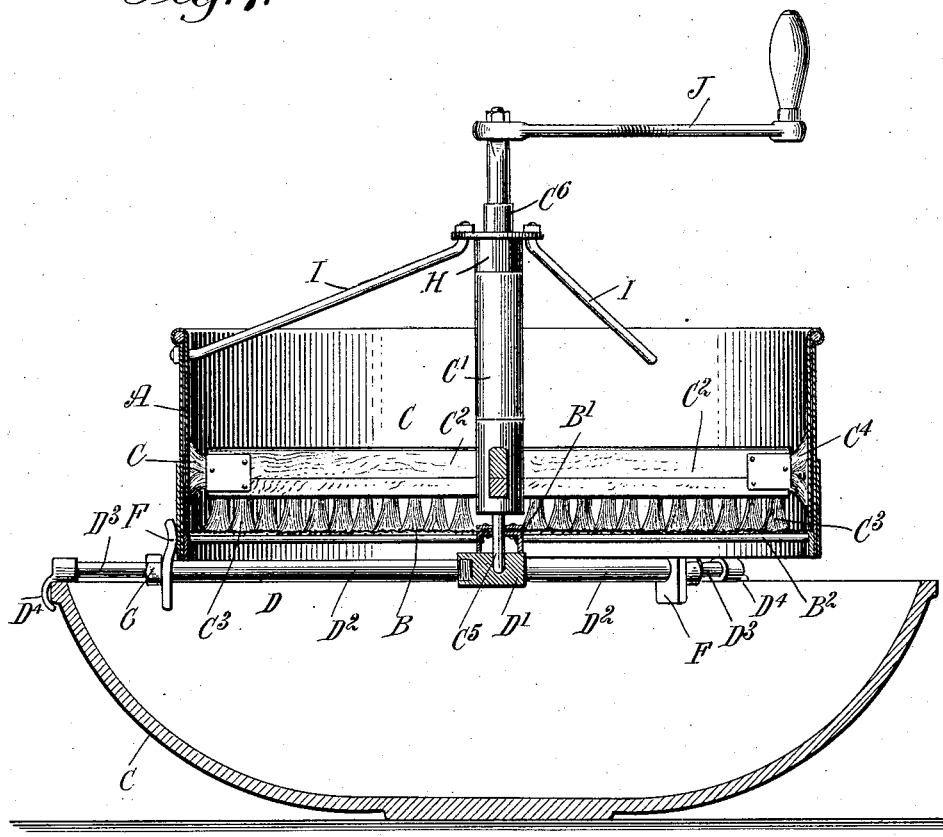
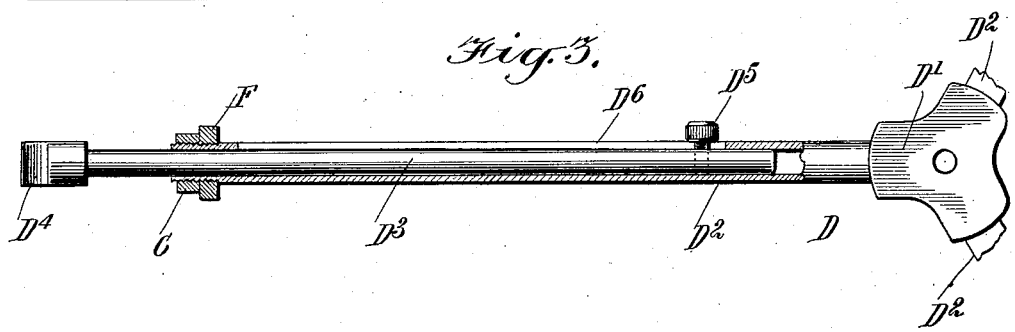
WITNESSES
INVENTOR
John H Zyburn
BY
ATTORNEYS

J. H. ZYBURN.
FLOUR SIFTER.
APPLICATION FILED DEC. 26, 1911.

1,024,962.

Patented Apr. 30, 1912.

2 SHEETS—SHEET 2.

WITNESSES

INVENTOR
John H. Zyburn
BY
ATTORNEYS

UNITED STATES PATENT OFFICE.

JOHN H. ZYBURN, OF BOUNDBROOK, NEW JERSEY.

FLOUR-SIFTER.

1,024,962. Specification of Letters Patent. Patented Apr. 30, 1912.

Application filed December 26, 1911. Serial No. 667,756.

*To all whom it may concern:*

Be it known that I, JOHN H. ZYBURN, a subject of the Emperor of Austria-Hungary, and a resident of Boundbrook, in the county of Somerset and State of New Jersey, have invented a new and Improved Flour-Sifter, of which the following is a full, clear, and exact description.

The object of the invention is to provide a new and improved flour sifter, more especially designed for use in bakeries, and arranged to permit convenient attachment to small or large bowls, and to insure a thorough sifting of the flour.

For the purpose mentioned, use is made of a support provided with lugs for engagement with a bowl, a sifter body having a bottom sieve and resting on the said support, and a revoluble brush journaled on the said sifter body and operating over the said bottom sieve.

A practical embodiment of the invention is represented in the accompanying drawings forming a part of this specification, in which similar characters of reference indicate corresponding parts in all the views.

Figure 2:
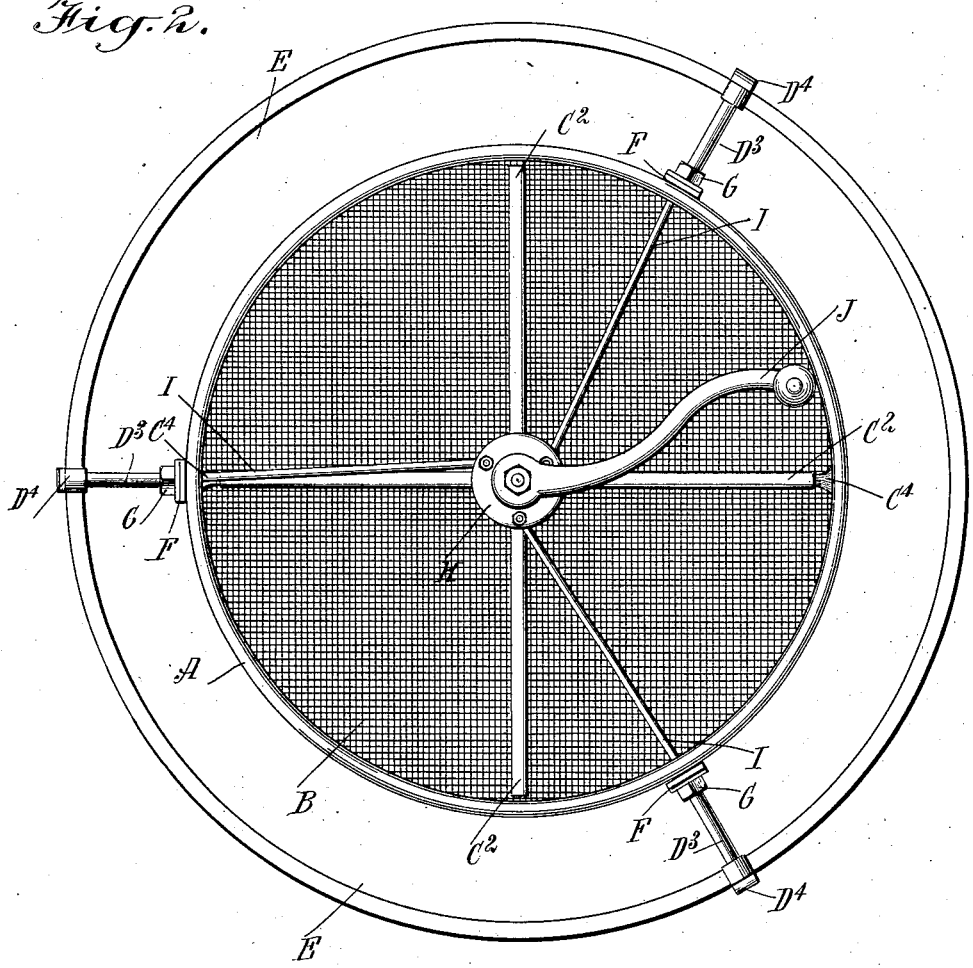
Figure 4:
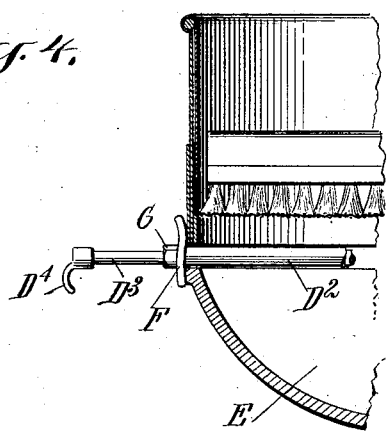

Figure 1 is a sectional side elevation of the flour sifter as applied to a large bowl; Fig. 2 is a plan view of the same; Fig. 3 is an enlarged plan view of part of the support, one of the arms being shown in section; and Fig. 4 is a sectional side elevation of part of the flour sifter as applied to a small sized bowl.

The cylindrical body A of the flour sifter is provided with a bottom sieve B, over which operates a revoluble brush C for sifting the flour through the meshes of the bottom sieve B. The lower end of the sifter body A rests centrally on a support D adapted to be fastened to the rim of a large or a small bowl E, such as is used in bakeries for receiving the sifted flour dropping down from the bottom sieve B.

The support D is arranged as follows: From its central step D' extends a series of tubular arms $D^2$, on the outer threaded end of which screw lugs F fastened in place by jam nuts G, and each of the lugs F extends upwardly to exteriorly engage the sifter body A so as to hold the same centrally on the support D. Each lug F is provided also with a downward extension adapted to engage the rim of a small sized bowl, as shown in Fig. 4, whenever the flour sifter is used on such a small sized bowl. In each of the arms $D^2$ telescopes an extension rod $D^3$ provided at its outer end with a downwardly-extending lug $D^4$ adapted to engage the rim of a larger bowl E so as to attach the support D to such large bowl, as plainly indicated in Figs. 1 and 2. Each of the extension rods $D^3$ is provided with a clamping screw $D^5$ (see Fig. 3) extending through a slot $D^6$ in the corresponding arm $D^2$, to permit of securely fastening the extension rod $D^3$ in position on the arm $D^2$ after the extension rod has been adjusted to engage with its lug $D^4$ the rim of the bowl on which the sifter is used at the time.

It is understood that flour sifters are used on bowls of a diameter running from eighteen inches to forty inches, and hence the support D is made adjustable for convenient attachment to a bowl of a desired size.

The bottom sieve B is provided with a central bearing B' from which radiate a number of supporting rods $B^2$ extending underneath the sieve B and attached at their outer ends to the sifter body A so as to properly support the bottom sieve B. The revoluble brush C is provided with a central hub C' from which radiate a number of arms $C^2$ provided at their under sides with bunches of bristles $C^3$ extending downwardly and engaging the upper surface of the bottom sieve B. A pair of alined brush arms $C^2$ are provided at their outer ends with bunches of bristles $C^4$ engaging the inner surface of the sifter body A so as to keep the same clean of flour a distance above the bottom sieve B. The hub C' of the brush C is provided with a shaft having its lower end $C^5$ engaging the bearing B' and the step D', as plainly shown in Fig. 1, so as to hold the sifter body A centrally in position on the support D and consequently centrally over the bowl E. The upper end $C^6$ of the brush shaft is journaled in a suitable bearing H supported by rods I from the upper end of the sifter body A, and on the said shaft end $C^6$ is secured a handle J under the control of the operator for turning the brush C so as to cause the bristles $C^3$ thereof to brush the flour through the meshes of the sieve B into the bowl E.

From the foregoing it will be seen that the support D can be readily placed in position on the bowl E, and the sifter body A can be securely and centrally attached to the support D so that the flour brushed through the meshes of the sieve B by the revoluble brush C drops into the bowl E and is hence not liable to be scattered or sifted outside of the bowl E.

Having thus described my invention, I claim as new and desire to secure by Letters Patent:

1. A flour sifter, comprising a support having a central step and arms radiating therefrom, a sifter body adapted to rest on the said arms and having a bottom sieve and a central bearing underneath the sieve, the bearing resting on the said step, adjustable clamping lugs on the said arms and engaging the said sifter body, and a revoluble agitating member journaled on the said sifter body and operating over the said bottom sieve.

2. A flour sifter, comprising a support having a central step and arms radiating therefrom, a sifter body adapted to rest on the said arms and having a bottom sieve and a central bearing underneath the sieve, the bearing resting on the said step, adjustable clamping lugs on the said arms and engaging the said sifter body, and a revoluble agitating member journaled on the said sifter body and operating over the said bottom sieve, the lower end of the shaft of the said agitating member engaging the said bearing and the said step.

3. A flour sifter, comprising a support having a central step and arms radiating therefrom, a sifter body adapted to rest on the said arms and having a bottom sieve and a central bearing underneath the sieve, the bearing resting on the said step, adjustable clamping lugs on the said arms and extending above and below the same, the upper portions of the lugs being adapted to engage the said sifter body and the lower portions of the said lugs being adapted to engage the rim of a bowl, and a revoluble agitating member journaled on the said sifter body and operating over the said bottom sieve.

4. A flour sifter, comprising a support having a central step and arms radiating therefrom, a sifter body adapted to rest on the said arms and having a bottom sieve and a central bearing underneath the sieve, the bearing resting on the said step, adjustable clamping lugs on the said arms and extending above and below the same, the upper portions of the lugs being adapted to engage the said sifter body and the lower portions of the said lugs being adapted to engage the rim of a bowl, a revoluble agitating member journaled on the said sifter body and operating over the said bottom sieve, and extension members adjustably held on the arms of the said support, each extension member having a fixed lug for engagement with the rim of a bowl.

In testimony whereof I have signed my name to this specification in the presence of two subscribing witnesses.

JOHN H. ZYBURN.

Witnesses:
  ROBT. T. BRAMPTON,
  WM. SCHURE.

---

Copies of this patent may be obtained for five cents each, by addressing the "Commissioner of Patents, Washington, D. C."